US012650922B2

(12) United States Patent
Corna et al.

(10) Patent No.: US 12,650,922 B2
(45) Date of Patent: Jun. 9, 2026

(54) ADAPTIVE TRACKING OF DATA PATTERNS FOR DEDUPLICATION

(71) Applicant: Micron Technology, Inc., Boise, ID (US)

(72) Inventors: Nicola Corna, Gorle (IT); Nicola Del Gatto, Cassina de' Pecchi (IT); Rishabh Dubey, Agrate Brianza (IT); Angelo Alberto Rovelli, Agrate Brianza (IT); Massimiliano Patriarca, Milan (IT); Daniele Balluchi, Cernusco Sul Naviglio (IT)

(73) Assignee: Micron Technology, Inc., Boise, ID (US)

(*) Notice: Subject to any disclaimer, the term of this patent is extended or adjusted under 35 U.S.C. 154(b) by 82 days.

(21) Appl. No.: 18/783,168

(22) Filed: Jul. 24, 2024

(65) Prior Publication Data

US 2026/0030160 A1     Jan. 29, 2026

(51) Int. Cl.
    *G06F 12/02*      (2006.01)
    *G06F 13/16*      (2006.01)
    *G06F 13/42*      (2006.01)

(52) U.S. Cl.
    CPC ...... *G06F 12/0292* (2013.01); *G06F 13/1668* (2013.01); *G06F 13/4221* (2013.01)

(58) Field of Classification Search
    None
    See application file for complete search history.

(56) References Cited

U.S. PATENT DOCUMENTS 11,860,834 B1 *   1/2024   Bassov ................. G06F 16/215

* cited by examiner

*Primary Examiner* — Charles J Choi

(74) *Attorney, Agent, or Firm* — Harrity & Harrity, LLP

(57)                ABSTRACT

In some implementations, a memory apparatus may receive a command to write data to volatile memory of the memory system. The memory apparatus may compare the data to one or more data patterns to identify whether the data matches a data pattern of the one or more data patterns. The memory apparatus may increment a reference counter associated with the data pattern based on identifying that the data matches the data pattern. The memory apparatus may write, based on identifying that a measure flag associated with the data pattern is set, the data to the volatile memory.

25 Claims, 6 Drawing Sheets

600

610 ～ Receive a command to write data to volatile memory of the memory system

620 ～ Compare the data to one or more data patterns to identify whether the data matches a data pattern of the one or more data patterns 630 ～ Increment a reference counter associated with the data pattern based on identifying that the data matches the data pattern 640 ～ Write, based on identifying that a measure flag associated with the data pattern is set, the data to the volatile memory

100

300 ⟶

| | Lock Flag 330-a | Clear Flag 325-a | Measure Flag 320-a | Default Data Pattern 310-a | Reference Counter 315-a |
|---|---|---|---|---|---|
| 305-a | Lock Flag 330-a | Clear Flag 325-a | Measure Flag 320-a | Default Data Pattern 310-a | Reference Counter 315-a |
| 305-b | Lock Flag 330-b | Clear Flag 325-b | Measure Flag 320-b | Data Pattern 310-b | Reference Counter 315-b |
| 305-c | Lock Flag 330-c | Clear Flag 325-c | Measure Flag 320-c | Data Pattern 310-c | Reference Counter 315-c |
| 305-d | Lock Flag 330-d | Clear Flag 325-d | Measure Flag 320-d | Data Pattern 310-d | Reference Counter 315-d |

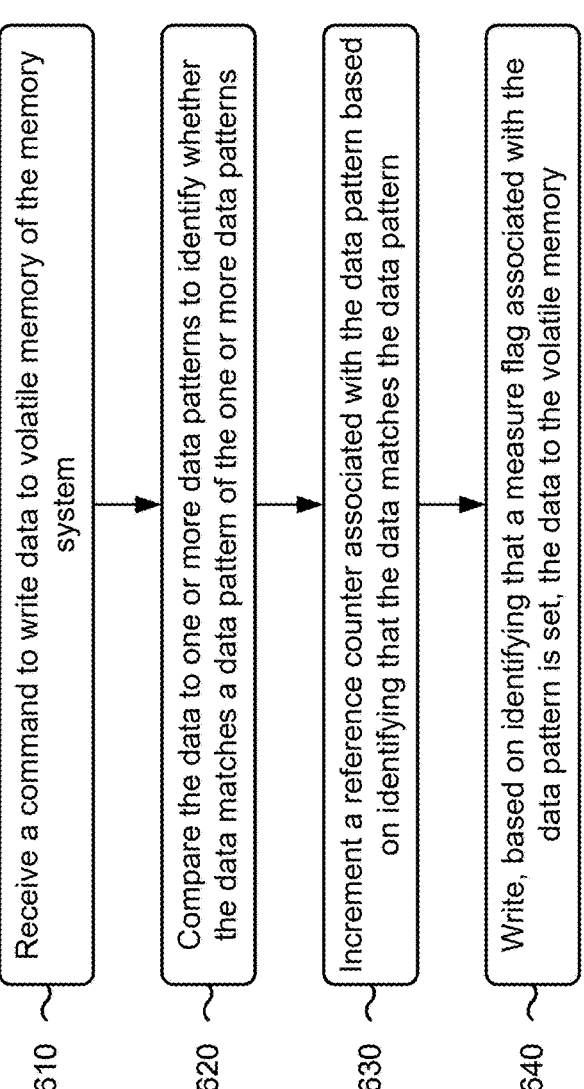

Receive a command to write data to volatile memory of the memory system

610

Compare the data to one or more data patterns to identify whether the data matches a data pattern of the one or more data patterns

620

Increment a reference counter associated with the data pattern based on identifying that the data matches the data pattern

630

Write, based on identifying that a measure flag associated with the data pattern is set, the data to the volatile memory

ADAPTIVE TRACKING OF DATA PATTERNS FOR DEDUPLICATION

TECHNICAL FIELD

The present disclosure generally relates to memory devices, memory device operations, and, for example, to adaptive tracking of data patterns for deduplication.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

BRIEF DESCRIPTION OF THE DRAWINGS

FIG. 3 is a diagram illustrating an example of a data structure that supports adaptive tracking of data patterns for deduplication.

FIG. 6 is a flowchart of an example method associated with adaptive tracking of data patterns for deduplication.

DETAILED DESCRIPTION

Figure 1:
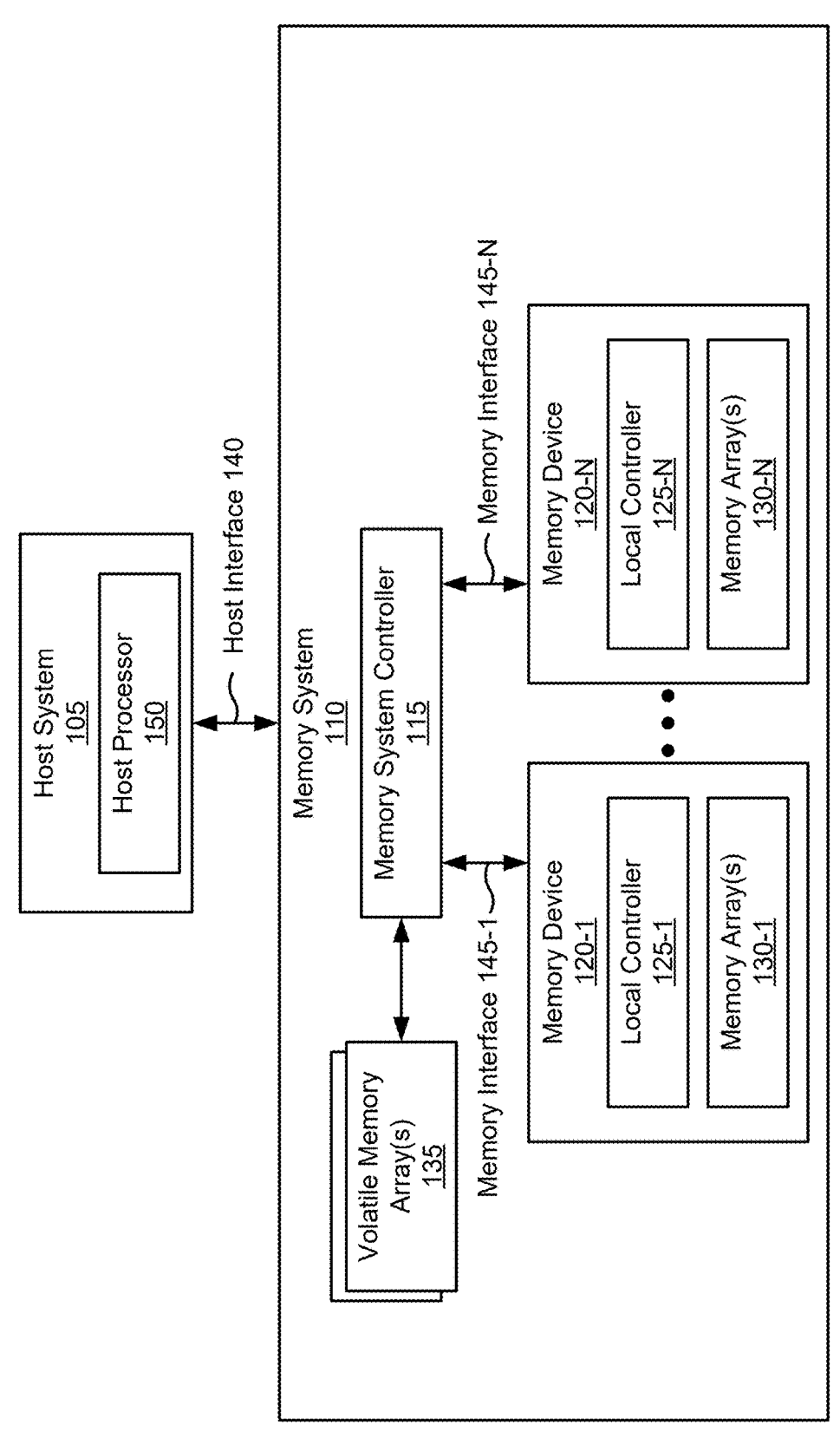
FIG. 1 is a diagram illustrating an example system capable of adaptive tracking of data patterns for deduplication.

Some computing systems, such as computing systems that operate according to a compute express link (CXL) protocol, may include a memory apparatus that utilizes deduplication to improve memory performance. For example, memory blocks are often duplicated in a system's memory. For example, two blocks may be duplicates when the respective data stored in the blocks are identical (e.g., the two blocks may each store the same sequence of bit values). This may occur when blocks are initialized but unused, when there are identical structures across multiple files of the same format that are loaded in memory, and/or when multiple identical files (e.g., the same library or kernel binary) are loaded in memory across different virtual machines hosted on the same system, among other examples.

As used herein, "deduplication" refers to a technique to reduce the quantity of duplicate data patterns (e.g., duplicate sequences of bits, duplicate blocks of memory) in a memory apparatus. For example, deduplication may include implementing one or more data structures to track data patterns frequently written to a volatile memory, such as a DRAM or other volatile memory device, of the memory apparatus. If a command to write a data pattern to the volatile memory is received, then the memory apparatus may compare the data pattern to the data structure(s) to identify whether the data pattern matches (e.g., is identical to, is a duplicate of) a tracked data pattern stored by the data structure(s). If the data pattern matches a tracked data pattern in the data structure(s), then the memory apparatus may map a logical address for the data pattern to a physical address of the tracked data pattern, without writing the data pattern to the volatile memory. A subsequent read command for the logical address will return the correct data pattern, despite the data pattern of the write command not being written to the volatile memory.

By using deduplication, a memory apparatus may improve performance. For example, duplicate data patterns may be written a reduced quantity of times (e.g., once). In some implementations, data patterns that may be associated with frequent duplication may be written to and read from a local memory of a memory controller (rather than the volatile memory) (e.g., in a cache, such as an SRAM). Because the performance (e.g., speed and/or bandwidth) of accessing the local memory may be better than the performance associated with accessing the volatile memory, such deduplication techniques may improve the performance of the memory apparatus.

However, in some memory apparatuses, storage space within the local memory may be limited. Thus, if a memory apparatus stores data structure(s) used to track deduplicated data patterns to the local memory, the size of the data structure(s) (e.g., the quantity of entries of the data structure(s)) may be limited by the size of the local memory, and accordingly the quantity of tracked data patterns may be limited. Because the efficiency of a deduplication technique may increase with the quantity of tracked data patterns (e.g., by allowing the memory apparatus to deduplicate an increased quantity of data patterns), limiting the quantity of tracked data patterns may reduce performance. Some deduplication techniques may employ reference counters or other tracking information stored in the volatile memory, which may support an increased size of data structure(s) used to track deduplicated data patterns, but may reduce performance, may be relatively resource expensive (e.g., due to increased processing overhead to manage the data structure(s) in the volatile memory), and/or may reduce the capacity of the volatile memory to store user data. Further, predicting which data patterns to track may be difficult because the frequency of accessing a given data pattern may depend on the specific programs or use cases of the computing system. Additionally, some data patterns may become more or less frequently used over the operation of the computing system. For example, a given program executed on a computing system may frequently use particular data patterns, such as global variables or other forms of data unique to the program that may benefit from deduplication. However, some memory apparatuses may be unaware of such data patterns, and thus may not deduplicate such data patterns, which may reduce performance associated with accessing these data patterns.

Some implementations described herein enable a memory apparatus to adaptively track data patterns used for deduplication. For example, the memory apparatus may store and/or manage a data structure that may include one or more entries having respective fields associated with one or more data patterns. An entry (e.g., associated with a given data pattern) may include a data pattern indication, a reference counter, a measure flag, a clear flag, and/or a lock flag. A reference counter of an entry may include an indication of a quantity of logical addresses that correspond to the data pattern associated with the entry. A measure flag of an entry may indicate whether the memory apparatus is to track access patterns of the data pattern associated with the entry. A clear flag of an entry may indicate whether the memory apparatus is to remove the entry. A lock flag of an entry may indicate whether the memory apparatus is to refrain from removing the entry.

In some implementations, the memory apparatus may update the data structure to add entries associated with respective candidate data patterns to be tracked by the memory apparatus. As part of generating the entries, the memory apparatus may set respective measure flags associated with the one or more candidate data patterns. In some implementations, the memory apparatus may update the data structure to modify one or more entries of the data structure. For example, the memory apparatus may identify whether a value of a reference counter of an entry having a set measure flag satisfies a promotion threshold. If the value satisfies the promotion threshold, then the memory apparatus may clear the measure flag. By clearing the measure flag, the memory apparatus may "promote" the data pattern associated with the entry, such that the memory apparatus may deduplicate subsequent write commands that include the data pattern, as described in greater detail elsewhere herein. Alternatively, if the value does not satisfy a demotion threshold, then the memory apparatus may set the clear flag of the entry. By setting the clear flag, the memory apparatus may "demote" the data pattern associated with the entry, such that the memory apparatus may decrement the reference counter of the entry in response to subsequent access commands (e.g., read commands and/or write commands) associated with the data pattern. For example, if a reference counter of an entry is zero (0) (e.g., after decrementing the reference counter of an entry having the clear flag set), then the memory apparatus may remove the entry from the data structure.

In some implementations, the memory apparatus may modify the data structure to adaptively manage data patterns for deduplication. For example, if the memory apparatus receives a write command associated with a data pattern and an address, then the memory apparatus may determine whether the data pattern corresponds to an entry of the data structure. If the received data pattern matches a data pattern of an entry, then the memory apparatus may determine whether the clear flag of the entry has been set. If the clear flag of the entry has been set, then the memory apparatus may decrement the reference counter of the entry. Alternatively, if the clear flag of an entry associated with the write command has not been set, then the memory apparatus may increment the reference counter of the entry. If the measure flag of the entry has been set, then the memory apparatus may write the data pattern to the volatile memory (e.g., the memory apparatus may refrain from deduplicating the data pattern). Alternatively, if the measure flag is not set, then the memory apparatus may generate a mapping between a logical address associated with the data pattern and a physical address associated with the entry.

As a result, by using the measure flags and clear flags to "promote" and/or "demote" candidate data patterns, the memory apparatus may improve the efficiency of deduplication. For example, by adaptively determining frequently used data patterns, the memory apparatus may configure the data structure(s) to improve performance of multiple different use cases. Further, by storing the data structure(s) (e.g., commonly used data patterns, reference counters) in local memory, the memory apparatus may improve performance of tracking (e.g., managing reference counters and associated flags) the commonly used data patterns and/or improve the performance of accessing the commonly used data patterns. Accordingly, adaptively tracking data patterns for deduplication may improve memory utilization, increase cost efficiency, and/or conserve system resources associated with deduplication. This enables improved performance for deduplication, which may result in improved performance associated with accessing deduplicated data patterns.

FIG. 1 is a diagram illustrating an example system 100 capable of adaptive tracking of data patterns for deduplication. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IOT) device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a small computer system interface (SCSI), a serial-attached SCSI (SAS), a serial advanced technology attachment (SATA) interface, a peripheral component interconnect express (PCIe) interface, an NVMe interface, a USB interface, a universal flash storage (UFS) interface, an eMMC interface, a double data rate (DDR) interface, and/or a DIMM interface.

In some examples, the memory device 120 may be a CXL compliant memory device 120. For example, the memory device 120 may include a PCIe/CXL interface (e.g., the host interface 140 may be associated with a PCIe/CXL interface). CXL is a high-speed CPU-to-device and CPU-to-memory interconnect designed to accelerate next-generation performance. In some examples, CXL technology may support maintaining memory coherency between the CPU memory space and memory on attached devices, which allows resource sharing for higher performance, reduced software stack complexity, and lower overall system cost. CXL is designed to be an industry open standard interface for high-speed communications. CXL technology is built on the PCIe infrastructure, leveraging PCIe physical and electrical interfaces to provide advanced protocol in areas such as input/output (I/O) protocol, memory protocol, and coherency interface.

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of, or in combination with, the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured receive a command to write data to the volatile memory; compare the data to one or more data patterns to identify whether the data matches a data pattern of the one or more data patterns; increment a reference counter associated with the data pattern based on identifying that the data matches the data pattern; and selectively, based on identifying whether a measure flag associated with the data pattern is set, write the data to the volatile memory or map a physical address associated with the data pattern to a logical address associated with the data.

In some implementations, one or more systems, devices, apparatuses, components, and/or controllers of FIG. 1 may be configured to receive a command to write data to volatile memory of the memory system; compare the data to one or more data patterns to identify whether the data matches a data pattern of the one or more data patterns; increment a reference counter associated with the data pattern based on identifying that the data matches the data pattern; and write, based on identifying that a measure flag associated with the data pattern is set, the data to the volatile memory.

In some implementations, one or more systems, devices, apparatuses, components, and/or controllers of FIG. 1 may include volatile memory and a CXL controller that includes a CXL interface, the CXL controller configured to receive a command to write data to the volatile memory; compare the data to one or more data patterns to identify whether the data matches a data pattern of the one or more data patterns; increment a reference counter associated with the data pattern based on identifying that the data matches the data pattern; and write, based on identifying that a measure flag associated with the data pattern is set, the data to the volatile memory.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
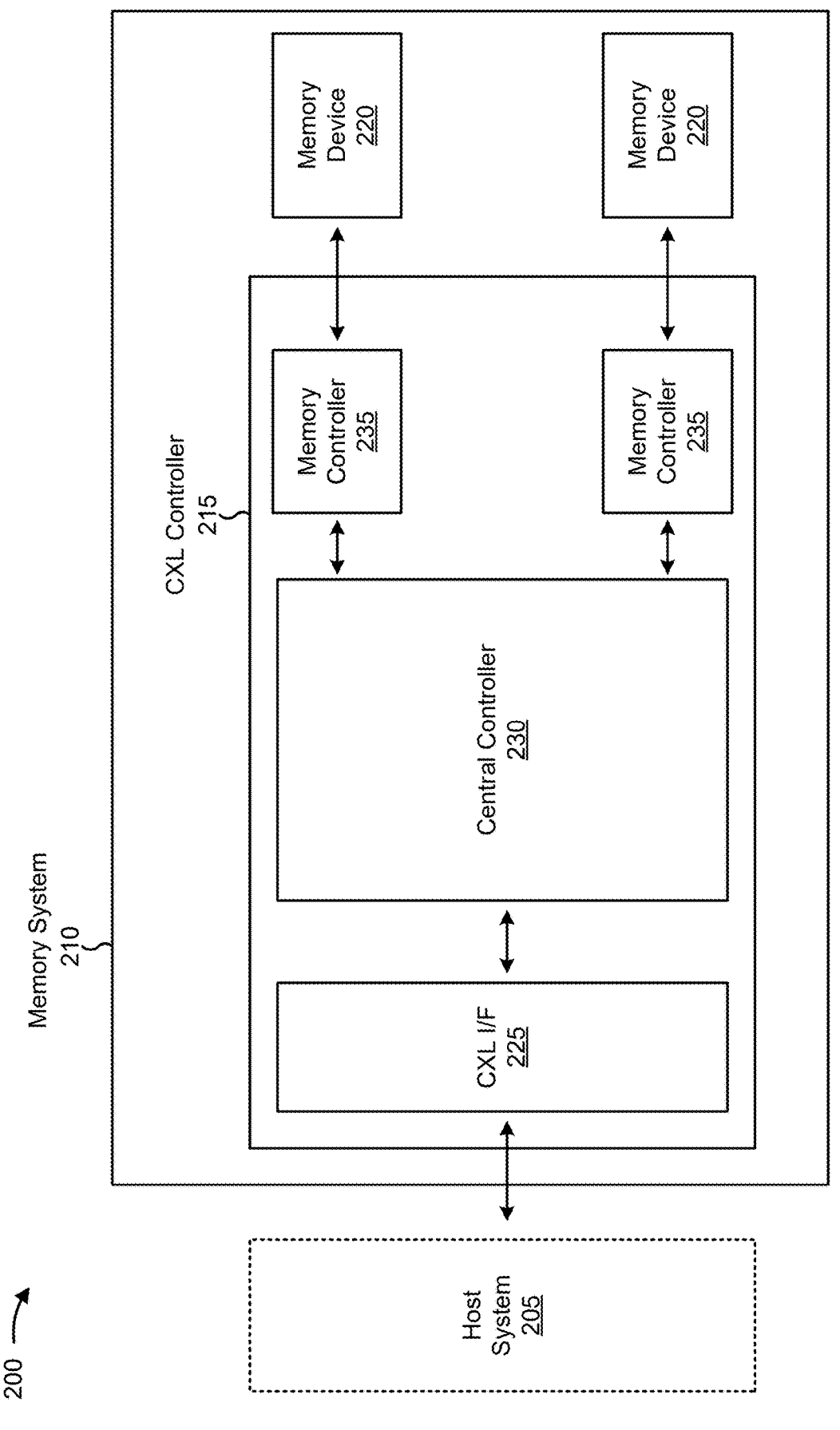
FIG. 2 is a diagram illustrating an example system that supports adaptive tracking of data patterns for deduplication.

FIG. 2 is a diagram illustrating an example system 200 that supports adaptive tracking of data patterns for deduplication. The system 200 may include one or more devices, apparatuses, and/or components for performing operations described herein. In some implementations, the system 200 may be a CXL system. For example, the system 200 may include a host system 205. The system 200 may further include a memory system 210 that includes a CXL controller 215 and one or more memory devices 220. FIG. 2 shows two memory devices 220 as an example. In other examples, the memory system 210 may include a different quantity of memory devices 220. The memory system 210 may be an example of the memory system 110. The host system 205 may include a CPU. In some implementations, the host system 205 may be an example of, or may include aspects of, the host system 105 and/or the host processor 150. The memory device(s) 220 may include volatile memory. In some implementations, the memory device(s) 220 may include DRAM. In some implementations, the memory device(s) 220 may be examples of the memory device(s) 120.

The CXL controller 215 may include an ASIC and/or an FPGA, among other examples. The CXL controller 215 may include a CXL interface 225 (shown as CXL I/F in FIG. 2), a central controller 230, and one or more memory controllers 235. In some implementations, the CXL interface 225 may be an example of, or may include aspects of, the host interface 140. In some implementations, the memory controller(s) 235 may be examples of the memory system controller 115.

The central controller 230 may include local memory, such as an SRAM array, that may be configured to support adaptive tracking of data patterns for deduplication. For example, the local memory may store one or more data structures associated with deduplication techniques, as described in greater detail elsewhere herein. In some implementations, the system 200 may store a mapping (e.g., in the local memory and/or in the memory device(s) 220) of logical addresses to physical addresses. A mapping of logical addresses to physical addresses may be referred to as a logical to physical (L2P) mapping table, an L2P address table, or an L2P table, and may be used to translate a logical memory address to a physical memory address.

For example, the memory system 210 may receive a command (e.g., from a host system 205), and the command may indicate a logical memory address, such as a logical block address (LBA), which is sometimes referred to as a host address. The memory system 210 may use one or more address translation tables to identify a physical memory address (sometimes called a physical address) corresponding to the logical memory address. For example, a read command may indicate an LBA from which data is to be read, or a write command may indicate an LBA to which data is to be written (or to overwrite data previously written to that LBA). The memory system 210 may translate that LBA (or multiple LBAs) to a physical address associated with the memory system 210 (e.g., a physical address in a memory array 130) using an L2P table (or multiple L2P tables). The physical address may indicate a physical location in non-volatile memory, such as a die, a plane, a block, a page, and/or a portion of the page where the data is located.

In some implementations, one or more systems, devices, apparatuses, components, and/or controllers of FIG. 1 and/or FIG. 2 may be configured to manage a data structure that may include one or more entries having respective fields associated with one or more data patterns. For example, the memory system 210 may update the data structure to add one or more candidate data patterns to be tracked by the memory system 210. As part of generating the one or more candidate data patterns, the memory system 210 may set respective measure flags associated with the one or more candidate data patterns. In some implementations, the memory system 210 may update the data structure to modify one or more entries of the data structure. For example, the memory system 210 may identify whether a value of a reference counter of an entry having a set measure flag satisfies a threshold. If the value satisfies the threshold, then the memory system 210 may clear the measure flag. By clearing the measure flag, the memory system 210 may "promote" the data pattern associated with the entry, such that the memory system 210 may deduplicate subsequent write commands that include the data pattern, as described in greater detail elsewhere herein. Alternatively, if the value does not satisfy the threshold, then the memory system 210 may set the clear flag of the entry. By setting the clear flag, the memory system 210 may "demote" the data pattern associated with the entry, such that the memory system 210 may decrement the reference counter of the entry in response to subsequent access commands (e.g., read commands and/or write commands) associated with the data pattern.

In some implementations, the memory system 210 may modify the data structure to adaptively manage data patterns for deduplication. For example, if the memory system 210 receives a write command associated with a data pattern and an address, then the memory apparatus may determine whether the data pattern corresponds to an entry of the data structure. If the received data pattern matches a data pattern of an entry, then the memory system 210 may determine whether the clear flag of the entry has been set. If the clear flag of the entry has been set, then the memory system 210 may decrement the reference counter of the entry. Alternatively, if the clear flag of an entry associated with the write command has not been set, then the memory system 210 may increment the reference counter of the entry. If the measure flag of the entry has been set, then the memory system 210 may write the data pattern to the volatile memory (e.g., the memory system 210 may refrain from deduplicating the data pattern). Alternatively, if the measure flag is not set, then the memory system 210 may generate a mapping between a logical address associated with the data pattern and a physical address associated with the entry.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

FIG. 3 is a diagram illustrating an example of a data structure 300 that supports adaptive tracking of data patterns for deduplication. A memory apparatus, such as the memory system 110 and/or the memory system 210, may manage the data structure 300. The data structure 300 may include one or more entries 305 (e.g., an entry 305-a, an entry 305-b, an entry 305-c, and/or an entry 305-d) having respective fields associated with one or more data patterns. For example, an entry 305 may include a data pattern indication 310 (e.g., a data pattern indication 310-a, a data pattern indication 310-b, a data pattern indication 310-c, and/or a data pattern indication 310-d), a reference counter 315 (e.g., a reference counter 315-a, a reference counter 315-b, a reference counter 315-c, and/or a reference counter 315-d), a measure flag 320 (e.g., a measure flag 320-a, a measure flag 320-b, a measure flag 320-c, and/or a measure flag 320-d), a clear flag 325 (e.g., a clear flag 325-a, a clear flag 325-b, a clear flag 325-c, and/or a clear flag 325-d), and/or a lock flag 330 (e.g., a lock flag 330-a, a lock flag 330-b, a lock flag 330-c, and/or a lock flag 330-d). In some examples, the memory apparatus may store all, or a portion, of the data structure 300 in a local memory, such as an SRAM array, which may improve performance associated with managing the data structure. For example, the memory apparatus may store the data structure 300 in the memory system controller 115, a local controller 125, the CXL controller 215, the central controller 230, and/or a memory controller 235, among other examples. Additionally, or alternatively, the memory apparatus may store all, or a portion, of the data structure 300 in a volatile memory (e.g., a memory device 120, a memory device 220). For example, the memory apparatus may store the first portion of the data structure 300 in the local memory and may store the second portion of the data structure 300 in the volatile memory. Such an implementation may improve efficiency and/or flexibility of managing the data structure 300, such as by supporting an increased size (e.g., an increased quantity of entries) of the data structure 300, relative to storing the data structure 300 solely in the local memory.

A data pattern indication 310 of an entry 305 may include an indication of a data pattern associated with the entry 305. For example, the data pattern indication 310 may include the data pattern (e.g., the sequence of bits of the data pattern). Alternatively, the data pattern indication 310 may include a hash or other representation of the data pattern. The memory apparatus may use the data structure 300 to identify whether a data pattern has been deduplicated. For example, if the memory apparatus receives an access command (e.g., a read command), then the memory apparatus may determine whether a logical address associated with the access command (e.g., included in the access command) maps to an entry 305 of the data structure 300.

In some implementations, to determine whether the logical address maps to an entry 305, the memory apparatus may employ a second data structure, such as a L2P table. The L2P table may include one or more entries that indicate respective mappings between logical addresses and physical addresses. A logical address of an entry may correspond to the data (e.g., the data pattern) stored at the physical address of an entry. In some examples, the memory apparatus, to determine whether a logical address associated with an access command maps to an entry 305, may determine whether the physical address corresponding to the logical address in the L2P table corresponds to a physical address of an entry 305 (e.g., a physical address of the local memory of the memory apparatus).

A reference counter 315 of an entry 305 may include an indication of a quantity of addresses that correspond to a data pattern associated with the entry 305 (e.g., a quantity of logical addresses of an L2P table that correspond to the data pattern). The memory apparatus may use the reference counter 315 to track access statistics of the data pattern associated with the entry 305. For example, if the memory apparatus receives a write command to write a data pattern, then the memory apparatus may compare the data pattern to one or more data pattern indications 310 of the data structure 300. If the received data pattern matches a data pattern of an entry 305 (e.g., if the received data pattern is the same as a data pattern of the entry 305, if a hash of the received data pattern is equal to a hash of a data pattern of the entry 305), then the memory apparatus may increment (e.g., increase by one) the reference counter 315 of the entry 305.

The memory apparatus may manage aspects of an entry 305 based on, in response to, or otherwise associated with the value of the measure flag 320 of the entry 305. A measure flag 320 of an entry 305 may include an indication of whether the memory apparatus is to track access patterns of the data pattern associated with the entry 305. For example, the measure flag 320 may be a flag (e.g., a bit). The memory apparatus may set the measure flag 320 by storing a first value, such as a logic "1", to the measure flag 320. The memory apparatus may clear (e.g., reset) the measure flag 320 by storing a second value, such as a logic "0", to the measure flag 320.

For example, if the memory apparatus receives a write command to store a data pattern corresponding to an entry 305 and the measure flag 320 is set, then the memory apparatus may increment the reference counter 315 of the entry 305. In such cases, the memory apparatus may write the data pattern to the volatile memory (e.g., the memory apparatus may refrain from deduplicating the data pattern). Alternatively, if the memory apparatus receives a write command to store a data pattern corresponding to an entry 305 and the measure flag 320 is not set, then the memory apparatus may increment the reference counter 315 of the entry 305 but may refrain from writing the data pattern to the volatile memory. Instead, the memory apparatus may generate a mapping (e.g., an entry of the L2P table) between a logical address associated with the data pattern (e.g., included in the write command) and a physical address associated with the entry 305 (e.g., the memory apparatus may deduplicate the data pattern).

In some examples, if the memory apparatus receives a write command to store a first data pattern to an address associated with an entry 305 (an address storing a second data pattern that corresponds to the entry 305) and the measure flag of the entry 305 set, then the memory apparatus may decrement the reference counter 315 of the entry 305. In such cases, the memory apparatus may write the first data pattern to the address in the volatile memory (e.g., by overwriting the second data pattern).

A clear flag 325 of an entry 305 may include an indication of whether the memory apparatus is to remove the entry 305. For example, the clear flag 325 may be a flag (e.g., a bit). The memory apparatus may set the clear flag 325 by storing a first value, such as a logic "1", to the clear flag 325. The memory apparatus may clear (e.g., reset) the clear flag 325 by storing a second value, such as a logic "0", to the clear flag 325.

If the memory apparatus receives an access command, such as a read command or a write command, associated with a data pattern that corresponds to an entry 305 and the clear flag 325 is set, then the memory apparatus may decrement (e.g., reduce by one) the reference counter 315 of the entry 305. In such cases, the memory apparatus may write the data pattern to the volatile memory. In some examples, the memory apparatus may remove or modify a mapping (e.g., an entry of the L2P table) between a logical address associated with the data pattern and a physical address associated with the entry 305. For example, the memory apparatus may modify the mapping to map the logical address to a physical address of the volatile memory corresponding to the data pattern.

A lock flag 330 of an entry 305 may include an indication to refrain from removing the entry 305. For example, the lock flag 330 may be a flag (e.g., a bit). The memory apparatus may set the lock flag 330 by storing a first value, such as a logic "1", to the lock flag 330. The memory apparatus may clear (e.g., reset) the lock flag 330 by storing a second value, such as a logic "0", to the lock flag 330. If the lock flag 330 is set, then the memory apparatus may refrain from removing the entry 305 as part of updating the data structure 300, as described in greater detail elsewhere herein. By implementing the lock flag 330, the memory apparatus may retain certain data patterns (e.g., default data patterns) in the data structure 300, such as data patterns commonly used by the memory apparatus, which may improve performance of access operations associated with default data patterns.

As indicated above, FIG. 3 is provided as an example. Other examples may differ from what is described with regard to FIG. 3.

Figure 4:
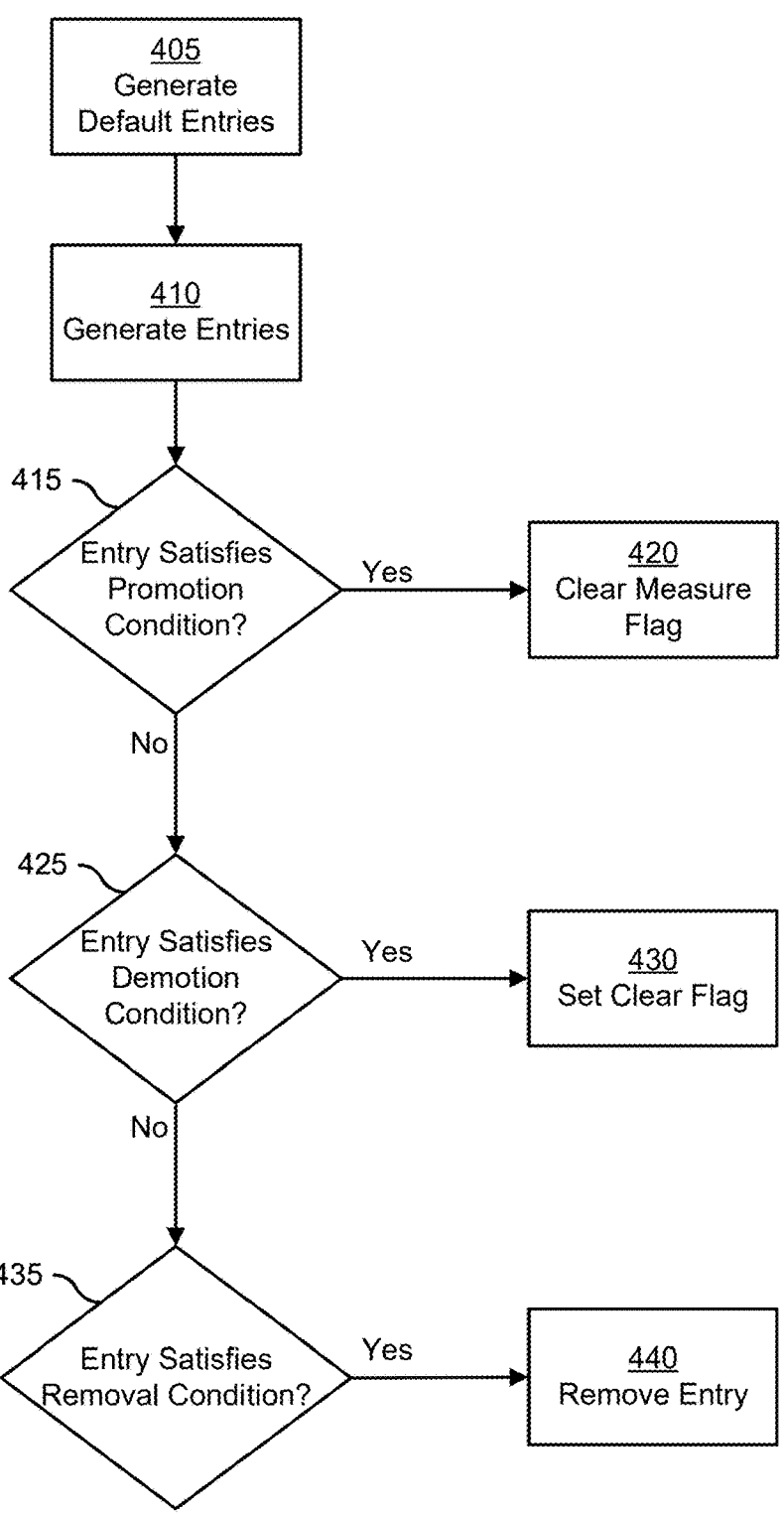
FIGS. 4 and 5 are diagrams of processes that support adaptive tracking of data patterns for deduplication.

FIG. 4 is a diagram of a process 400 that supports adaptive tracking of data patterns for deduplication. The operations described in connection with FIG. 4 may be performed by a memory apparatus, such as the memory system 110 and/or the memory system 210. Additionally, or alternatively, the operations described in connection with FIG. 4 may be performed by one or more components of the memory system 110 and/or the memory system 210, such as the memory system controller 115, one or more memory devices 120, one or more local controllers 125, the CXL controller 215, the central controller 230, one or more memory controllers 235, and/or one or more memory devices 220. Additionally, or alternatively, some operations described in connection with FIG. 4 may be performed by the system 100, the host system 105, one or more components of the host system 105 (e.g., the host processor 150), the host interface 140, and/or the host system 205.

As illustrated by the process 400, the memory apparatus may manage one or more data structures, such as the data structure 300, to adaptively manage data patterns for deduplication. In some implementations, as shown by reference number 405, the memory apparatus may generate one or more default entries of a data structure associated with one or more default data patterns. For example, the memory apparatus may store the default data pattern(s) to the data structure. The default data pattern(s) may be data patterns commonly used by the memory apparatus, such as configuration data for the memory apparatus, a sequence of bits (e.g., a sequence of binary data, such as a sequence of one (1) values and/or zero (0) values), and/or other data patterns that the memory apparatus may determine. As part of generating the one or more entries for respective default data patterns, the memory apparatus may set lock flags (e.g., lock flags 330) associated with respective entries. In some cases, the memory apparatus may generate the one or more entries as part of an initialization procedure (e.g., as part of booting or powering on the memory apparatus). For example, firmware associated with the memory apparatus may be configured to generate the one or more entries for respective default data patterns.

In some implementations, the memory apparatus may update the data structure to add one or more candidate data entries. For example, the memory apparatus may add one or more candidate entries periodically (e.g., according to a configured period) and/or may add one or more candidate entries in response to, based on, or otherwise associated with one or more trigger events. For example, a trigger event may include receiving a command received from a host system, detecting that one or more reference counters of the data structure satisfy a threshold, and/or performing one or more memory management operations, among other examples.

As shown by reference number 410, the memory apparatus may generate one or more candidate entries for the data structure (e.g., for respective candidate data patterns). The one or more candidate entries may correspond to one or more candidate data patterns to be tracked by the memory apparatus. As part of generating the one or more candidate entries, the memory apparatus may set measure flags (e.g., measure flags 320) associated with respective candidate entries. In some implementations, the memory apparatus may identify the candidate data pattern(s) using access statistics associated with the candidate data pattern(s), such as a frequency of access operations associated with a candidate data pattern (e.g., a quantity of access operations associated with the candidate data pattern received within a duration), and/or using other methods.

In some implementations, the memory apparatus may update the data structure to modify one or more entries of the data structure. For example, the memory apparatus may update the one or more entries periodically (e.g., according to a configured period) and/or may update the one or more entries in response to, based on, or otherwise associated with a trigger event, such as in response to a command received from a host system, in response to one or more reference counters of the data structure satisfying a threshold, in response to a size (e.g., a quantity of entries) of the data structure satisfying a threshold, and/or as part of memory management operations, among other examples.

As shown by reference number 415, the memory apparatus may identify whether an entry satisfies a promotion condition. For example, if a value of a reference counter of the entry satisfies a promotion threshold, if the measure flag of the entry is set, and if the lock flag is not set, then the memory apparatus may determine that the entry satisfies the promotion condition. Alternatively, if the value of the reference counter does not satisfy the promotion threshold, if the measure flag of the entry is not set, or if the lock flag is set, then the memory apparatus may determine that the entry does not satisfy the promotion condition. If the entry satisfies the promotion condition, then, as shown by reference number 420, the memory apparatus may clear the measure flag. Additionally, the memory apparatus may reset the reference counter (e.g., may set the value of the reference counter to zero). By clearing the measure flag, the memory apparatus may "promote" the data pattern associated with the entry. For example, by clearing the measure flag, the memory apparatus may deduplicate subsequent write commands that include the data pattern, as described in greater detail elsewhere herein. Accordingly, performance of the memory apparatus associated with accessing the data pattern (e.g., performance of read commands to retrieve the data pattern, performance of write commands to write the data pattern) may be improved.

As shown by reference number 425, the memory apparatus may identify whether an entry satisfies a demotion condition. For example, if the value of the reference counter does not satisfy a demotion threshold and if the lock flag is not set, then the memory apparatus may determine that the entry satisfies the demotion condition. Alternatively, if the value of the reference counter satisfies the demotion threshold or if the lock flag is set, then the memory apparatus may determine that the entry fails to satisfy the demotion condition. If the entry satisfies the demotion condition, then, as shown by reference number 430, the memory apparatus may set the clear flag of the entry. By setting the clear flag, the memory apparatus may "demote" the data pattern associated with the entry. For example, by setting the clear flag, the memory apparatus may decrement the reference counter of the entry in response to subsequent access commands (e.g., read commands and/or write commands) associated with the data pattern.

As shown by reference number 435, the memory apparatus may identify whether an entry satisfies a removal condition. For example, if measure flag of the entry is set and the lock flag is not set, and if the value of the reference counter does not satisfy a removal threshold, then the memory apparatus may determine that the entry satisfies the removal condition. If the measure flag is not set, then the memory apparatus may determine that the entry does not satisfy the removal condition. If the lock flag is set, then the memory apparatus may determine that the entry does not satisfy the removal condition. If the value of the reference counter satisfies the removal threshold, then the memory apparatus may determine that the entry does not satisfy the removal condition. If the memory apparatus determines that the entry satisfies the removal condition, then, as shown by reference number 440, the memory apparatus may remove the entry from the data structure. Because the reference counter does not satisfy the removal threshold (e.g., because the value of the reference counter is zero), the data pattern associated with the entry may not be written to the volatile memory. Further, a mapping between logical addresses and physical addresses (e.g., the L2P table) may not include entries corresponding to the entry. Accordingly, the memory apparatus may remove the entry without risk of corrupting data. By removing an entry from the data structure, the memory apparatus may reduce the size of the data structure, which may allow the memory apparatus to store other entries in place of the removed entry. For example, after removing an entry, the memory apparatus may add a candidate entry to the data structure, which may allow the memory apparatus to dynamically manage deduplication of data patterns during operation and thus improve performance. Further, such an implementation may support a reduced size of the data structure, which may improve the ability of the memory apparatus to store the data structure in the local memory and thus improve performance associated with accessing the data structure.

As indicated above, FIG. 4 is provided as an example. Other examples may differ from what is described with regard to FIG. 4.

Figure 5:
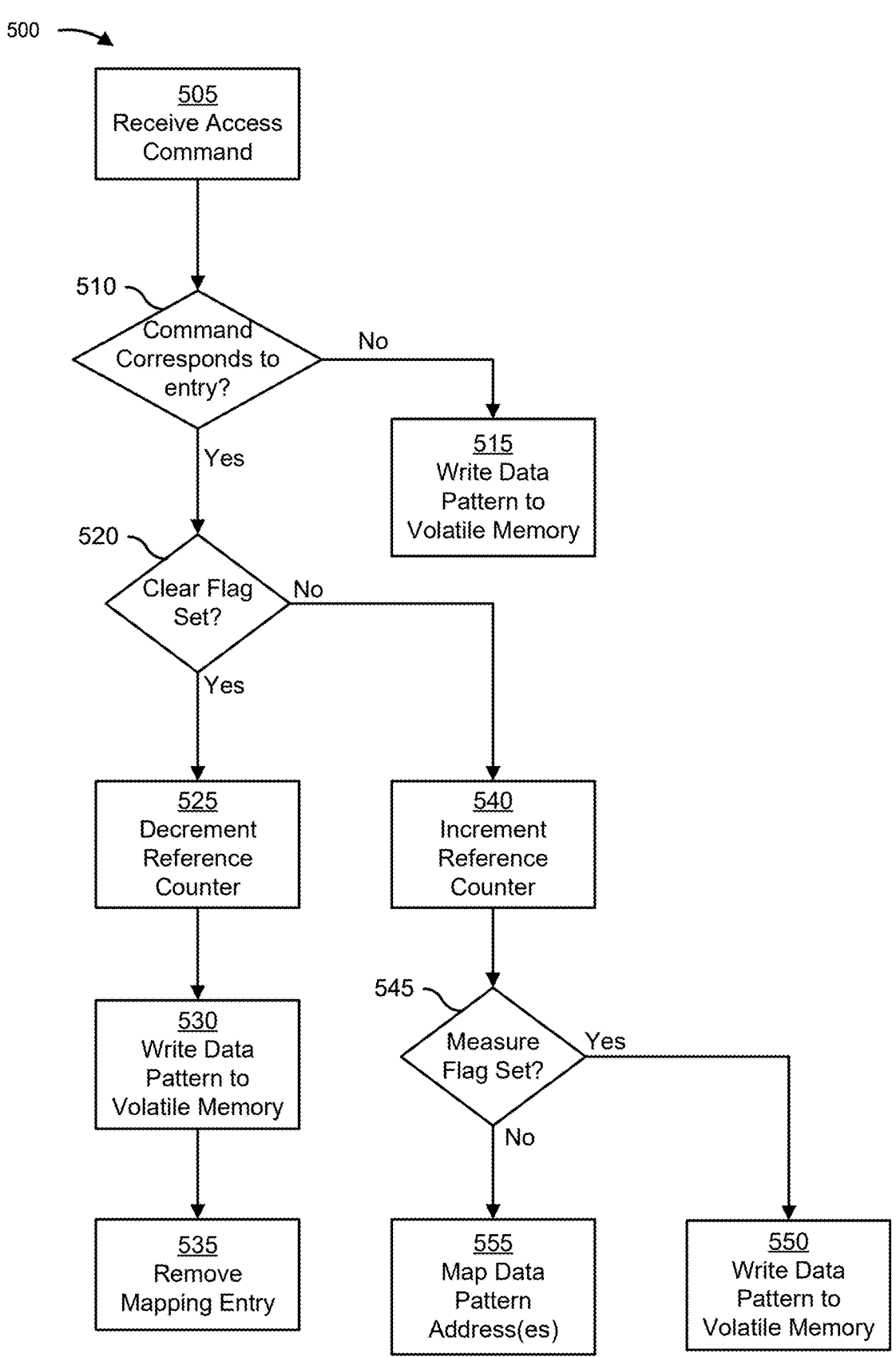

FIG. 5 is a diagram of a process 500 that supports adaptive tracking of data patterns for deduplication. The operations described in connection with FIG. 5 may be performed in connection with the process 400. The operations described in connection with FIG. 5 may be performed by a memory apparatus, such as the memory system 110 and/or the memory system 210. Additionally, or alternatively, the operations described in connection with FIG. 5 may be performed by one or more components of the memory system 110 and/or the memory system 210, such as the memory system controller 115, one or more memory devices 120, one or more local controllers 125, the CXL controller 215, the central controller 230, one or more memory controllers 235, and/or one or more memory devices 220. Additionally, or alternatively, some operations described in connection with FIG. 5 may be performed by the system 100, the host system 105, one or more components of the host system 105 (e.g., the host processor 150), the host interface 140, and/or the host system 205.

As illustrated by the process 500, the memory apparatus may modify the data structure to adaptively manage data patterns for deduplication. For example, as shown by reference number 505, the memory apparatus may obtain a command, such as by receiving a write command (e.g., from a host system), which may include or may be associated with a data pattern and an address (e.g., a logical address) corresponding to the write command. As shown by reference number 510, the memory apparatus may determine whether the data pattern corresponds to an entry of the data structure (e.g., the data structure 300). For example, the memory apparatus may compare the data pattern to one or more data pattern indications (e.g., data pattern indications 310) of the data structure. If the received data pattern does not match any of the data pattern indications of the data structure, then, as shown by reference number 515, the memory apparatus may write the data to the volatile memory (e.g., without modifying the data structure).

Alternatively, if the received data pattern matches a data pattern of an entry (e.g., if the received data pattern is the same as a data pattern of the entry, if a hash of the received data pattern is equal to a hash of a data pattern of the entry), then, as shown by reference number 520, the memory apparatus may determine whether the clear flag of the entry has been set (e.g., whether the clear flag is equal to a given value, such as "1"). If the clear flag of the entry has been set, then, as shown by reference number 525, the memory apparatus may decrement the reference counter of the entry.

Decrementing the reference counter may support the memory apparatus in removing an entry from the data structure (e.g., as described in operations in connection to reference number 425 of process 400). Accordingly, by decrementing the reference counter, the memory apparatus may remove data patterns from the data structure that are not commonly used. By doing so, the memory apparatus may reduce the size of the data structure, which may allow the memory apparatus to store other entries in place of the removed entry. For example, after removing an entry, the memory apparatus may add a candidate entry to the data structure, which may allow the memory apparatus to dynamically manage deduplication of data patterns during operation and thus improve performance.

Additionally, if the clear flag has been set, then, as shown by reference number 530, the memory apparatus may write the data pattern to the volatile memory. In some implementations, the memory apparatus may perform aspects of the process 500 in response to other types of access commands. For example, if the memory apparatus receives a read command for a second data pattern included in a second entry of the data structure, the memory apparatus may determine whether the clear flag has been set. If the clear flag has been set, then the memory apparatus may decrement the reference counter of the second entry. Additionally, as shown by reference number 535, the memory apparatus may modify a mapping for the logical address associated with the second data pattern. For example, the memory apparatus may modify the mapping for the logical address to map to a physical address in the volatile memory corresponding to the second data pattern, rather than to the physical address of the second entry in the local memory.

Alternatively, if the clear flag of an entry associated with the write command has not been set, then, as shown by reference number 540, the memory apparatus may increment the reference counter of the entry. As shown by reference number 545, the memory apparatus may determine whether the measure flag of the entry has been set to selectively write the data pattern to the volatile memory or map a physical address associated with the entry to a logical address associated with the data pattern. As used herein, "selectively" performing an operation means to either perform the operation or refrain from performing the operation. For example, selectively performing an operation based on whether a condition is satisfied means that the operation is performed if the condition is satisfied and that the operation is not performed if the condition is not satisfied (or vice versa). Thus, selectively performing an operation may include determining whether to perform the operation and then either performing the operation or refraining from performing the operation based on that determination. As used herein, "selectively" performing a first operation or a second operation means to perform either the first operation or the second operation. For example, selectively performing a first operation or a second operation based on whether a condition is satisfied means that the first operation is performed if the condition is satisfied and that the second operation is performed if the condition is not satisfied (or vice versa). Thus, selectively performing a first operation or a second operation may include determining whether to perform either the first operation or the second operation and then performing either the first operation or the second operation based on that determination.

If the measure flag has been set, then, as shown by reference number 550, the memory apparatus may write the data pattern to the volatile memory (e.g., the memory apparatus may refrain from deduplicating the data pattern). Alternatively, if the measure flag is not set, then, as shown by reference number 555, the memory apparatus may generate a mapping (e.g., an entry of the L2P table) between a logical address associated with the data pattern (e.g., included in the write command) and a physical address associated with the entry. In such cases, the memory apparatus may refrain from writing the data pattern to the volatile memory (e.g., the memory apparatus may deduplicate the data pattern). By implementing the measure flag, the clear flag, and/or the lock flag, the memory apparatus may dynamically manage deduplication and thus improve performance. For example, by using the measure flag and the clear flag to remove certain entries, the memory apparatus may configure the data structure to include other candidate entries. Additionally, the memory apparatus may determine whether a data pattern of a candidate entry is frequently accessed (e.g., based on the value of the reference counter. If so, the memory apparatus may promote the candidate entry, and thus improve performance associated with accessing the data pattern. Accordingly, the memory apparatus may tailor the data structure to different use cases. Further, by storing the data structure (e.g., commonly used data patterns, reference counters) in local memory, the memory apparatus may improve performance of tracking (e.g., managing reference counters and associated flags) the commonly used data patterns and/or improve the performance of accessing the commonly used data patterns.

As indicated above, FIG. 5 is provided as an example. Other examples may differ from what is described with regard to FIG. 5.

FIG. 6 is a flowchart of an example method 600 associated with adaptive tracking of data patterns for deduplication. In some implementations, a memory apparatus (e.g., the memory system 110, the memory devices 120, the memory system 210, and/or the memory devices 220) may perform or may be configured to perform the method 600. In some implementations, another device or a group of devices separate from or including the memory apparatus (e.g., the host system 105 and/or the host system 205) may perform or may be configured to perform the method 600. Additionally, or alternatively, one or more components of the memory apparatus (e.g., the memory system controller 115, a local controller 125, the volatile memory arrays 135, the CXL controller 215, the central controller 230, and or the memory controllers 235) may perform or may be configured to perform the method 600. Thus, means for performing the method 600 may include the memory apparatus and/or one or more components of the memory apparatus. Additionally, or alternatively, a non-transitory computer-readable medium may store one or more instructions that, when executed by the memory apparatus, cause the memory apparatus to perform the method 600.

As shown in FIG. 6, the method 600 may include receiving a command to write data to volatile memory of the memory system (block 610). As further shown in FIG. 6, the method 600 may include comparing the data to one or more data patterns to identify whether the data matches a data pattern of the one or more data patterns (block 620). As further shown in FIG. 6, the method 600 may include incrementing a reference counter associated with the data pattern based on identifying that the data matches the data pattern (block 630). As further shown in FIG. 6, the method 600 may include writing, based on identifying that a measure flag associated with the data pattern is set, the data to the volatile memory (block 640).

The method 600 may include additional aspects, such as any single aspect or any combination of aspects described below and/or described in connection with one or more other methods or operations described elsewhere herein.

In a first aspect, the method 600 includes receiving a second command to write second data to the volatile memory, comparing the second data to the one or more data patterns to identify whether the second data matches a second data pattern of the one or more data patterns, incrementing a second reference counter corresponding to the second data pattern based on identifying that the second data matches the second data pattern, and mapping, based on identifying that a second measure flag associated with the second data pattern is not set, a physical address associated with the second data pattern to a logical address associated with the second data, and refraining from writing the second data to the volatile memory based on identifying that the second measure flag is not set.

In a second aspect, alone or in combination with the first aspect, the method 600 includes obtaining a second command associated with second data, decrementing, based on the second data corresponding to a second data pattern of the one or more data patterns and based on a clear flag associated with the second data pattern being set, a second reference counter corresponding to the second data pattern, and writing, based on the clear flag being set, the second data to the volatile memory.

In a third aspect, alone or in combination with one or more of the first and second aspects, the method 600 includes removing, from a data structure, an entry associated with the second data pattern based on the clear flag being set.

Although FIG. 6 shows example blocks of a method 600, in some implementations, the method 600 may include additional blocks, fewer blocks, different blocks, or differ-ently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a system includes volatile memory; and a controller configured to: receive a command to write data to the volatile memory; compare the data to one or more data patterns to identify whether the data matches a data pattern of the one or more data patterns; increment a reference counter associated with the data pattern based on identifying that the data matches the data pattern; and selectively, based on identifying whether a measure flag associated with the data pattern is set, write the data to the volatile memory or map a physical address associated with the data pattern to a logical address associated with the data.

In some implementations, a method includes receiving, by a controller of a memory system, a command to write data to volatile memory of the memory system; comparing, by the controller, the data to one or more data patterns to identify whether the data matches a data pattern of the one or more data patterns; incrementing, by the controller, a reference counter associated with the data pattern based on identifying that the data matches the data pattern; and writing, by the controller and based on identifying that a measure flag associated with the data pattern is set, the data to the volatile memory.

In some implementations, a system includes volatile memory; and a CXL controller that includes a CXL inter-face; and a controller configured to: receive a command to write data to the volatile memory; compare the data to one or more data patterns to identify whether the data matches a data pattern of the one or more data patterns; increment a reference counter associated with the data pattern based on identifying that the data matches the data pattern; and write, based on identifying that a measure flag associated with the data pattern is set, the data to the volatile memory.

The foregoing disclosure provides illustration and description but is not intended to be exhaustive or to limit the implementations to the precise forms disclosed. Modi-fications and variations may be made in light of the above disclosure or may be acquired from practice of the imple-mentations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
volatile memory; and
a controller configured to:
   receive a command to write data to the volatile memory;
   compare the data to one or more data patterns to identify whether the data matches a data pattern of the one or more data patterns;
   increment a reference counter associated with the data pattern based on identifying that the data matches the data pattern; and
   selectively, based on identifying whether a measure flag associated with the data pattern is set, write the data to the volatile memory or map a physical address associated with the data pattern to a logical address associated with the data.

2. The system of claim 1, wherein, to selectively write the data to the volatile memory or map the physical address to the logical address, the controller is further configured to:

map the physical address associated with the data pattern to the logical address based on identifying that the measure flag is not set; and
refrain from writing the data to the volatile memory based on identifying that the measure flag is not set.

3. The system of claim 1, wherein, to selectively write the data to the volatile memory or map the physical address to the logical address, the controller is further configured to:
write the data to the volatile memory based on identifying that the measure flag is set.

4. The system of claim 1, wherein the controller is further configured to:
obtain a second command associated with second data;
decrement, based on the second data corresponding to a second data pattern of the one or more data patterns and based on a clear flag associated with the second data pattern being set, a second reference counter corresponding to the second data pattern; and
write, based on the clear flag being set, the second data to the volatile memory.

5. The system of claim 4, wherein the controller is further configured to:
remove, from a data structure, an entry associated with the second data pattern based on the clear flag being set.

6. The system of claim 1, wherein the controller is further configured to:
generate an entry of a data structure, the entry being associated with the data pattern, wherein the controller, to generate the entry, is configured to:
   store an indication of the data pattern in the data structure; and
   set the measure flag associated with the data pattern.

7. The system of claim 1, wherein the controller is further configured to:
generate one or more entries of a data structure, the one or more entries being associated with one or more default data patterns, wherein the controller, to generate the one or more entries, is configured to:
   store one or more indications of the one or more default data patterns in the data structure; and
   set one or more lock flags associated with the one or more default data patterns.

8. The system of claim 1, wherein the controller is further configured to:
clear the measure flag based on identifying that a value of the reference counter satisfies a threshold.

9. The system of claim 1, wherein the controller is further configured to:
set a clear flag associated with a second data pattern of the one or more data patterns based on a value of a second reference counter that is associated with the second data pattern not satisfying a threshold.

10. The system of claim 1, wherein the controller is further configured to:
remove, based on a value of the reference counter not satisfying a threshold, an entry of a data structure, the entry being associated with the data pattern.

11. The system of claim 1, wherein the controller is further configured to:
store one or more entries of a data structure, the one or more entries being associated with the one or more data patterns, to a static random access memory (SRAM) of the controller,
   wherein the one or more entries comprise reference counters and measure flags for respective data patterns of the one or more data patterns.

12. The system of claim 1, wherein the controller is further configured to:

store one or more entries of a data structure, the one or more entries being associated with the one or more data patterns, to the volatile memory, wherein the one or more entries comprise reference counters and measure flags for respective data patterns of the one or more data patterns.

13. A method, comprising:

receiving, by a controller of a memory system, a command to write data to volatile memory of the memory system;

comparing, by the controller, the data to one or more data patterns to identify whether the data matches a data pattern of the one or more data patterns;

incrementing, by the controller, a reference counter associated with the data pattern based on identifying that the data matches the data pattern; and writing, by the controller and based on identifying that a measure flag associated with the data pattern is set, the data to the volatile memory.

14. The method of claim 13, further comprising:

receiving a second command to write second data to the volatile memory;

comparing the second data to the one or more data patterns to identify whether the second data matches a second data pattern of the one or more data patterns;

incrementing a second reference counter corresponding to the second data pattern based on identifying that the second data matches the second data pattern; and mapping, based on identifying that a second measure flag associated with the second data pattern is not set, a physical address associated with the second data pattern to a logical address associated with the second data; and refraining from writing the second data to the volatile memory based on identifying that the second measure flag is not set.

15. The method of claim 13, further comprising:

obtaining a second command associated with second data;

decrementing, based on the second data corresponding to a second data pattern of the one or more data patterns and based on a clear flag associated with the second data pattern being set, a second reference counter corresponding to the second data pattern; and writing, based on the clear flag being set, the second data to the volatile memory.

16. The method of claim 15, further comprising:

removing, from a data structure, an entry associated with the second data pattern based on the clear flag being set.

17. A system, comprising:

volatile memory; and a compute express link (CXL) controller, comprising:

a CXL interface; and a controller configured to:

receive a command to write data to the volatile memory;

compare the data to one or more data patterns to identify whether the data matches a data pattern of the one or more data patterns;

increment a reference counter associated with the data pattern based on identifying that the data matches the data pattern; and write, based on identifying that a measure flag associated with the data pattern is set, the data to the volatile memory.

18. The system of claim 17, wherein the controller is further configured to:

receive a second command to write second data to the volatile memory;

compare the second data to the one or more data patterns to identify whether the second data matches a second data pattern of the one or more data patterns;

increment a second reference counter corresponding to the second data pattern based on identifying that the second data matches the second data pattern;

map, based on identifying that a second measure flag associated with the second data pattern is not set, a physical address associated with the second data pattern to a logical address associated with the second data; and refrain from writing the second data to the volatile memory based on identifying that the second measure flag is set.

19. The system of claim 17, wherein the controller is further configured to:

obtain a second command associated with second data;

decrement, based on the second data corresponding to a second data pattern of the one or more data patterns and based on a clear flag associated with the second data pattern being set, a second reference counter corresponding to the second data pattern; and write, based on the clear flag being set, the second data to the volatile memory.

20. The system of claim 19, wherein the controller is further configured to:

remove, from a data structure, an entry associated with the second data pattern based on the clear flag being set.

21. The system of claim 17, wherein the controller is further configured to:

generate an entry of a data structure, the entry associated with the data pattern, wherein the controller, to generate the entry of the data structure, is configured to:

store an indication of the data pattern in the data structure; and set the measure flag associated with the data pattern.

22. The system of claim 17, wherein the controller is further configured to:

generate one or more entries of a data structure, the one or more entries associated with one or more default data patterns, wherein the controller, to generate the one or more entries, is configured to:

store one or more indications of the one or more default data patterns in the data structure; and set one or more lock flags associated with the one or more default data patterns.

23. The system of claim 17, wherein the controller is further configured to:

clear the measure flag based on a value of the reference counter satisfying a threshold.

24. The system of claim 17, wherein the controller is further configured to:

set a clear flag associated with a second data pattern of the one or more data patterns based on a value of a second reference counter associated with the second data pattern not satisfying a threshold.

25. The system of claim 17, wherein the controller is further configured to:

remove an entry of a data structure, the entry associated with the data pattern, based on a value of the reference counter not satisfying a threshold.

* * * * *